(12) United States Patent
Obara et al.

(10) Patent No.: US 11,949,825 B2
(45) Date of Patent: Apr. 2, 2024

(54) SCANNING OPTICAL DEVICE AND IMAGE FORMING APPARATUS WITH BEARING SURFACES AND REGULATING PORTIONS CONSTRUCTED TO REDUCE LASER DEVIATION OF A REFLECTION MIRROR

(71) Applicant: CANON KABUSHIKI KAISHA, Tokyo (JP)

(72) Inventors: Mitsuhiro Obara, Shizuoka (JP); Taku Murotani, Shizuoka (JP); Hiroki Katayama, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 18 days.

(21) Appl. No.: 17/746,819

(22) Filed: May 17, 2022

(65) Prior Publication Data

US 2022/0377198 A1 Nov. 24, 2022

(30) Foreign Application Priority Data

May 24, 2021 (JP) .................................. 2021-087162

(51) Int. Cl.
  *G03G 15/04* (2006.01)
  *G03G 21/16* (2006.01)
  *H04N 1/00* (2006.01)

(52) U.S. Cl.
  CPC ... *H04N 1/00551* (2013.01); *G03G 15/04045* (2013.01); *G03G 21/1666* (2013.01); *H04N 1/00559* (2013.01)

(58) Field of Classification Search
  USPC ......................................................... 399/218
  See application file for complete search history.

(56) References Cited

U.S. PATENT DOCUMENTS

| | | | |
|---|---|---|---|
| 7,508,859 B2 | 3/2009 | Azami et al. | 372/101 |
| 8,355,192 B2 | 1/2013 | Obara | 359/204.1 |
| 8,681,405 B2 | 3/2014 | Obara | 359/204.1 |
| 8,786,927 B2 | 7/2014 | Obara | 359/204.1 |
| 9,551,955 B2 | 1/2017 | Murotani et al. | G02B 26/12 |

(Continued)

FOREIGN PATENT DOCUMENTS

| | | |
|---|---|---|
| JP | 2006-017865 | 1/2006 |
| JP | 2015-161725 | 9/2015 |

(Continued)

*Primary Examiner* — Quana Grainger
(74) *Attorney, Agent, or Firm* — Venable LLP

(57) ABSTRACT

A scanning optical device includes a deflector, a reflecting mirror, a housing to accommodate the deflector and the mirror; and an elastic member to urge the mirror toward the housing. The mirror includes a first surface urged by the elastic member, a second surface opposite to the first surface, a third surface and a fourth surface perpendicular to the first and second surfaces. The housing includes a bearing surface to support the second surface and a regulating portion to regulate movement of the mirror to a mirror widthwise direction, perpendicular to a mirror longitudinal direction and parallel with the second surface, and toward an opening of the housing. The regulating portion is provided opposite to only a part of the third surface so that a ridge line of the mirror between the second surface and the third surface does not contact the regulating member even an attitude of the mirror changes in a direction away from the bearing surface.

16 Claims, 13 Drawing Sheets

(56) References Cited

U.S. PATENT DOCUMENTS

| | | | |
|---|---|---|---|
| 9,857,722 B2 | 1/2018 | Obara | G03G 15/04072 |
| 10,151,995 B2 | 12/2018 | Kojima | G03G 15/0409 |
| 10,845,727 B2 | 11/2020 | Obara | G02B 26/12 |
| 11,086,248 B2 | 8/2021 | Ohta et al. | G03G 15/0409 |
| 11,194,264 B2 | 12/2021 | Katayama et al. | G03G 15/04036 |
| 2014/0211288 A1* | 7/2014 | Ohta | H04N 1/113 |
| | | | 359/205.1 |
| 2015/0002594 A1* | 1/2015 | Ishidate | G03G 15/04072 |
| | | | 359/205.1 |
| 2017/0010561 A1* | 1/2017 | Miyashima | G02B 26/126 |
| 2020/0122483 A1 | 4/2020 | Tanaka et al. | G02B 26/127 |
| 2021/0173202 A1* | 6/2021 | Matsuo | G02B 26/125 |

FOREIGN PATENT DOCUMENTS

| | | |
|---|---|---|
| JP | 2017-016063 | 1/2017 |
| JP | 2017-120442 | 7/2017 |

* cited by examiner (a)

(b)

(a)

(b)

(a)

(b)

(a)

(b)

SCANNING OPTICAL DEVICE AND IMAGE FORMING APPARATUS WITH BEARING SURFACES AND REGULATING PORTIONS CONSTRUCTED TO REDUCE LASER DEVIATION OF A REFLECTION MIRROR

FIELD OF THE INVENTION AND RELATED ART

The present invention relates to a scanning optical device and an image forming apparatus, and relates to the scanning optical device which performs optical writing by using a laser light in an image forming apparatus such as a laser beam printer (LBP), a digital copier, and a digital fax machine (FAX).

Conventionally, in a scanning optical device which is used in a laser beam printer, a digital copier, etc., a laser light, which is optically modulated and emitted from a laser element which is a light source according to an image signal, is periodically deflected and scanned by an optical deflector such as a rotatable polygon mirror. And the laser light from the optical deflector is formed into an image in a spot shape on the image forming surface on the photosensitive drum by an image forming optical element with fθ property. The spot on the image forming surface forms an electrostatic latent image according to a main scanning which is scanned by the optical deflector and a sub-scanning which is scanned by rotation of the photosensitive drum, and performs image recording. Incidentally, the optical deflector and the image forming optical element are supported by a housing (casing), and an opening of the housing is closed by a cover.

Some scanning optical devices include a reflecting mirror to reflect the laser light to emit the laser light at a desired angle to the image forming surface on the photosensitive drum. The reflecting mirror, which directs the laser light deflected by the optical deflector toward an object to be scanned, is in a form of an elongated mirror with a large aspect ratio. For this reason, the reflecting mirror is often supported at both end portions in a longitudinal direction, and the reflecting mirror is supported by and fixed to a bearing surface while it is urged by a regulating member such as a holding spring. There are various forms of regulating members as a means of fixing the reflecting mirror, and, for example, a regulating member, which is described in Japanese Laid-Open Patent Application (JP-A) 2017-120442, adopts a constitution in which a pressure on the reflecting mirror is applied only in a direction perpendicular to a mirror reflecting surface in order to reduce a size and a thickness of the scanning optical device.

In a case that the pressure on the reflecting mirror is applied only in the direction perpendicular to the mirror reflecting surface, since a position of the reflecting mirror in a direction parallel to the mirror reflecting surface is not constrained, so the reflecting mirror may move in the direction parallel to the reflecting surface. As long as the laser light does not extend beyond the mirror reflecting surface, even in a case that the reflecting mirror is moved in the parallel direction, an emitting position of the laser light on the photosensitive drum does not change and printing quality is not affected. For this reason, in JP-A 2017-120442, a position regulating portion is provided so that the reflecting mirror does not move too much. However, in a constitution of JP-A 2017-120442, the position regulating portion is arranged in such a way that the position regulating member may come into contact with a ridgeline of the reflecting mirror when an attitude of the reflecting mirror changes due to impact in a transportation process of carrying the scanning optical device, etc. Thus, the ridgeline of the reflecting mirror may get caught in the position regulating portion and the reflecting mirror may not return to its original attitude. In that case, since the emitting position of the laser light which is emitted to the photosensitive drum changes due to a change in the attitude of the reflecting mirror with respect to the housing, it may lead to a decrease in printing accuracy and a decrease in image quality such as color shift.

An object of the present invention is to reduce a deviation of laser light emission due to a change in the attitude of the reflecting mirror, in considering these conditions.

SUMMARY OF THE INVENTION

A principal object of the present invention is to provide a scanning optical device for scanning an object to be scanned with a laser light, the scanning optical device comprising, a light source constituted to emit the laser light, a deflection unit constituted to deflect the laser light emitted from the light source, a reflecting mirror constituted to reflect the laser light deflected by the deflection unit to guide to the object to be scanned, a housing constituted to accommodate the deflection unit and the reflecting mirror, and an elastic member constituted to urge the reflecting mirror toward the housing, wherein the reflecting mirror includes a first surface urged by the elastic member, a second surface opposite to the first surface, a third surface substantially perpendicular to the first surface and the second surface, in parallel with a longitudinal direction of the reflecting mirror and closer to an opening of the housing, and fourth surface opposite to the third surface, and wherein the housing includes a bearing surface constituted to support the second surface, and a regulating portion constituted to regulate movement of the reflecting mirror to a mirror widthwise direction, substantially perpendicular to the longitudinal direction and substantially parallel with the second surface, and toward the opening of the housing, the regulating portion being provided opposite to only a part of the third surface so that a ridge line of the reflecting mirror between the second surface and the third surface does not contact the regulating member even an attitude of the reflecting mirror changes in a direction away from the bearing surface when the reflecting mirror is viewed in the longitudinal direction.

Further features of the present invention will become apparent from the following description of exemplary embodiments with reference to the attached drawings.

DESCRIPTION OF THE EMBODIMENTS

In the following, a method of performing the present invention will be described in detail with reference to figures by the embodiment.

Embodiment (Image Forming Apparatus)

Figure 1:
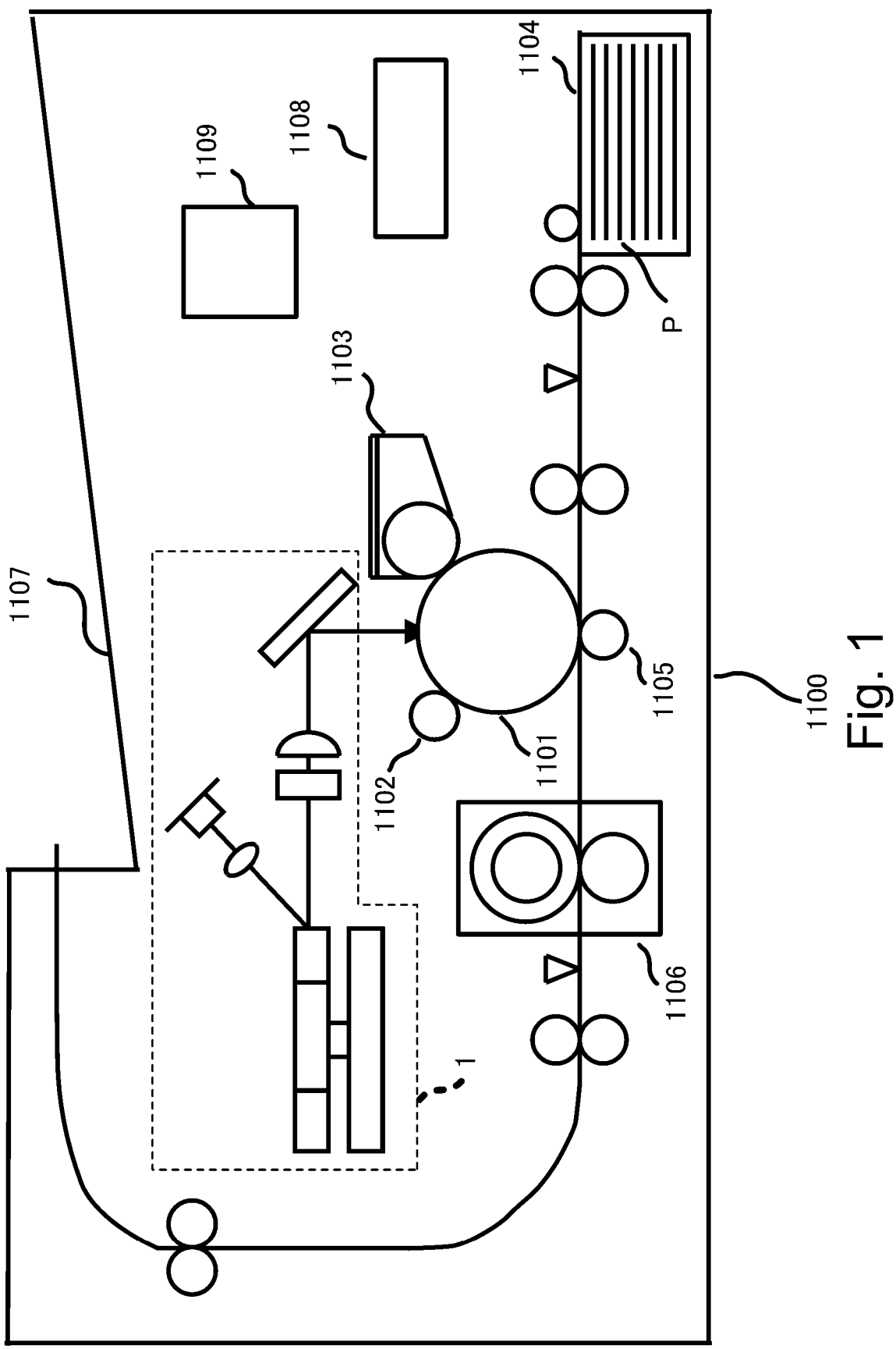
FIG. 1 is a schematic sectional view showing an image forming apparatus according to an embodiment of the present invention.

An example of a schematic constitution of an image forming apparatus is shown in FIG. 1. A laser beam printer 1100 (hereinafter, referred to as a printer 1100) is provided with a photosensitive drum 1101, a charging portion 1102, and a developing portion 1103. The photosensitive drum 1101 is an image bearing member on which a latent image (hereinafter, referred to as an electrostatic latent image) is formed by a scanning optical device 1. The charging portion 1102 uniformly charges the photosensitive drum 1101. The developing portion 1103 forms a toner image by develops the electrostatic latent image which is formed on the photosensitive drum 1101 using toner. The printer 1100 transfers the toner image which is formed on the photosensitive drum (on an object to be scanned) to a sheet P as a recording material which is supplied from a cassette 1104 by a transfer portion 1105, and fixes an unfixed toner image which is transferred to the sheet P by a fixing device 1106. The photosensitive drum 1101, the charging portion 1102, the developing portion 1103, and the transfer portion 1105 are an image forming portion (an image forming means). The fixed sheet P is discharged to a tray 1107. Further, the printer 1100 is equipped with a power source apparatus 1108, and supplies electric power from the power source apparatus 1108 to a driving portion such as a motor and a control portion 1109. The control portion 1109 includes a CPU (not shown) and controls an image forming operation by the image forming portion and a feeding operation of the sheet P, etc. Incidentally, the image forming apparatus, to which the scanning optical device 1 is able to be applied, is not limited to a constitution which is shown in FIG. 1.

(Scanning Optical Device)

Figure 2:
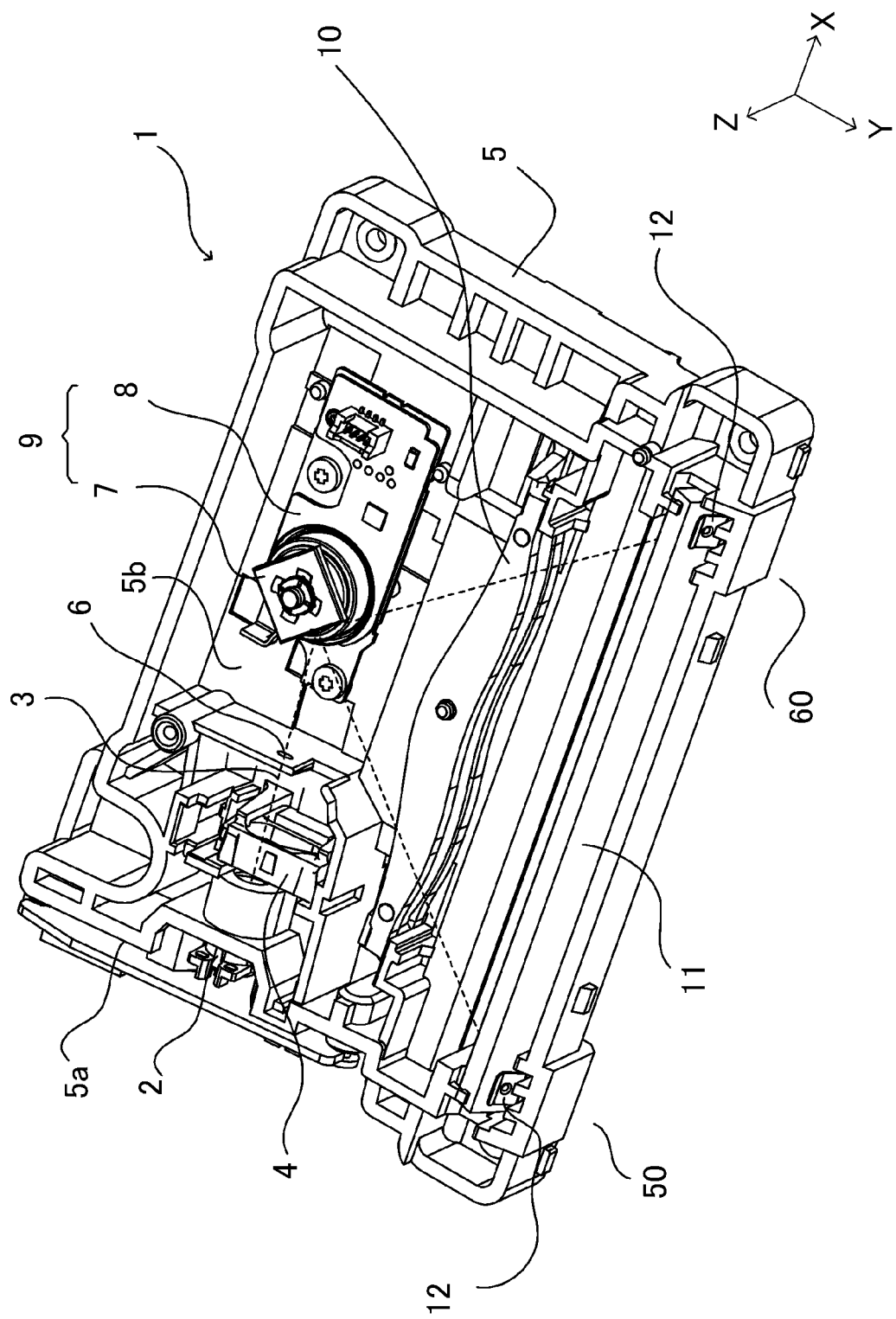
FIG. 2 is a perspective view showing a scanning optical device according to the embodiment of the present invention.

The scanning optical device 1, to which the present invention is able to be applied, will be described by using figures. FIG. 2 is the perspective view of the scanning optical device 1 according to the embodiment. A housing 5, which is a casing, includes a side surface 5a in which it is possible to mount a laser light source unit 2 which is a light source and a bottom surface 5b in which it is possible to mount an optical deflector 9 which is a deflection means, and an opposite side of the bottom surface 5b is opening. As shown in FIG. 2, a laser light 3, which is emitted from the laser light source unit 2 and shown in a dashed line, is substantially focused by an anamorphic lens 4. And the laser light 3 is regulated to a predetermined beam diameter by an optical diaphragm 6 which is formed on the housing 5 and emitted to a reflecting surface of a rotatable polygon mirror 7. The rotatable polygon mirror 7 is rotatably driven by a driving circuit board 8 and, deflects and scans the laser light 3 which is entered. Here, the rotatable polygon mirror 7 and the driving circuit board 8 constitute the optical deflector 9. The laser light 3, which is deflected by the optical deflector 9, passes through an fθ lens 10, is reflected by a reflecting mirror 11 which is an elongated optical member, is focused and scanned onto the photosensitive drum 1101 (see FIG. 1) which is an image bearing member, and forms an electrostatic latent image. The elongated reflecting mirror 11, for example at two points of both end portions in a longitudinal direction of the reflecting mirror 11, is urged by a holding spring (elastic member) 12 at a positioning portion 50 and a positioning portion 60 of the housing 5. In this way, the reflecting mirror 11 is mounted on and supported by the housing 5. The opening of the housing 5 is closed by a cover (not shown). Incidentally, in a following description, the longitudinal direction of the reflecting mirror 11 and a scanning direction of the laser light are defined as an X direction which is a first direction, a direction of a rotational axis of the rotatable polygon mirror 7 is defined as a Z direction, and a direction substantially perpendicular to the X direction and the Z direction is defined as a Y direction.

Figure 4:
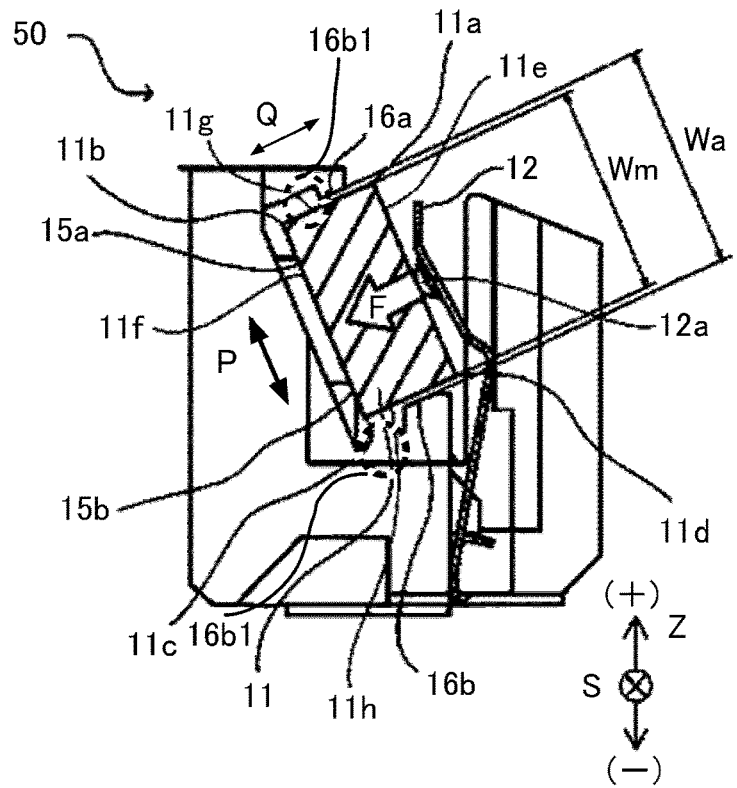
FIG. 4, part(a) and part(b), is a sectional view showing the reflecting mirror while it is in its normal attitude according to the embodiment of the present invention.
Figure 4:
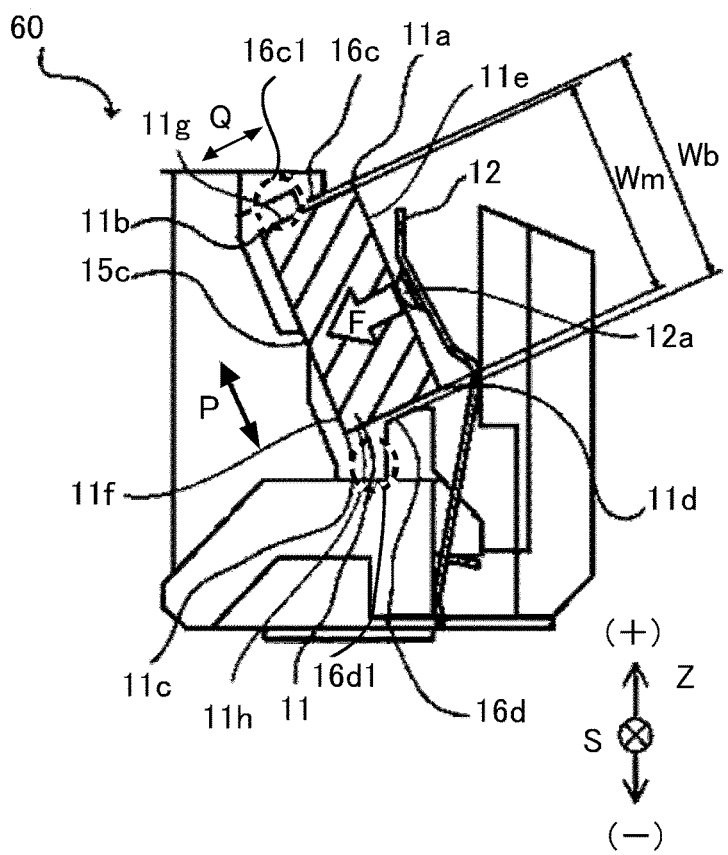

Here, the reflecting mirror 11 includes four ridgelines 11a (third ridgeline), 11b (first ridgeline), 11c (second ridgeline), and 11d (fourth ridgeline), as shown in FIG. 4, etc., as will be described below. The reflecting mirror 11 includes a surface 11e (first surface) which is urged by the holding spring 12 and a surface 11f (second surface) which is urged and supported by the housing 5 on an opposite side of the surface 11e. Further, the reflecting mirror 11 includes a face 11g (third face) and a face 11h (fourth face) which are substantially perpendicular to the face 11e and the face 11f, and the face 11g is a surface in a + side (upper side) of the Z direction (a surface on a side which is closer to the opening of the housing 5), and the face 11h is a surface in a − side (lower side) of the Z direction. The ridgeline 11a is a ridgeline specified by the surface 11e and the surface 11g, and a ridgeline of the surface 11e in a + side (upper side) of the Z direction. The ridgeline 11d is a ridgeline specified by the surface 11e and the surface 11h, and a ridgeline of the surface 11e in a − side (lower side) of the Z direction. The ridgeline 11b is a ridgeline specified by the surface 11f and the surface 11g, and a ridgeline of the surface 11f in a + side (upper side) of the Z direction. The ridgeline 11c is a ridgeline specified by the surface 11f and the surface 11h, and a ridgeline of the surface 11f in a − side (lower side) of the Z direction. Incidentally, the surface 11f is a reflecting surface which reflects the laser light.

(Reflecting Mirror mounting)

Figure 3:
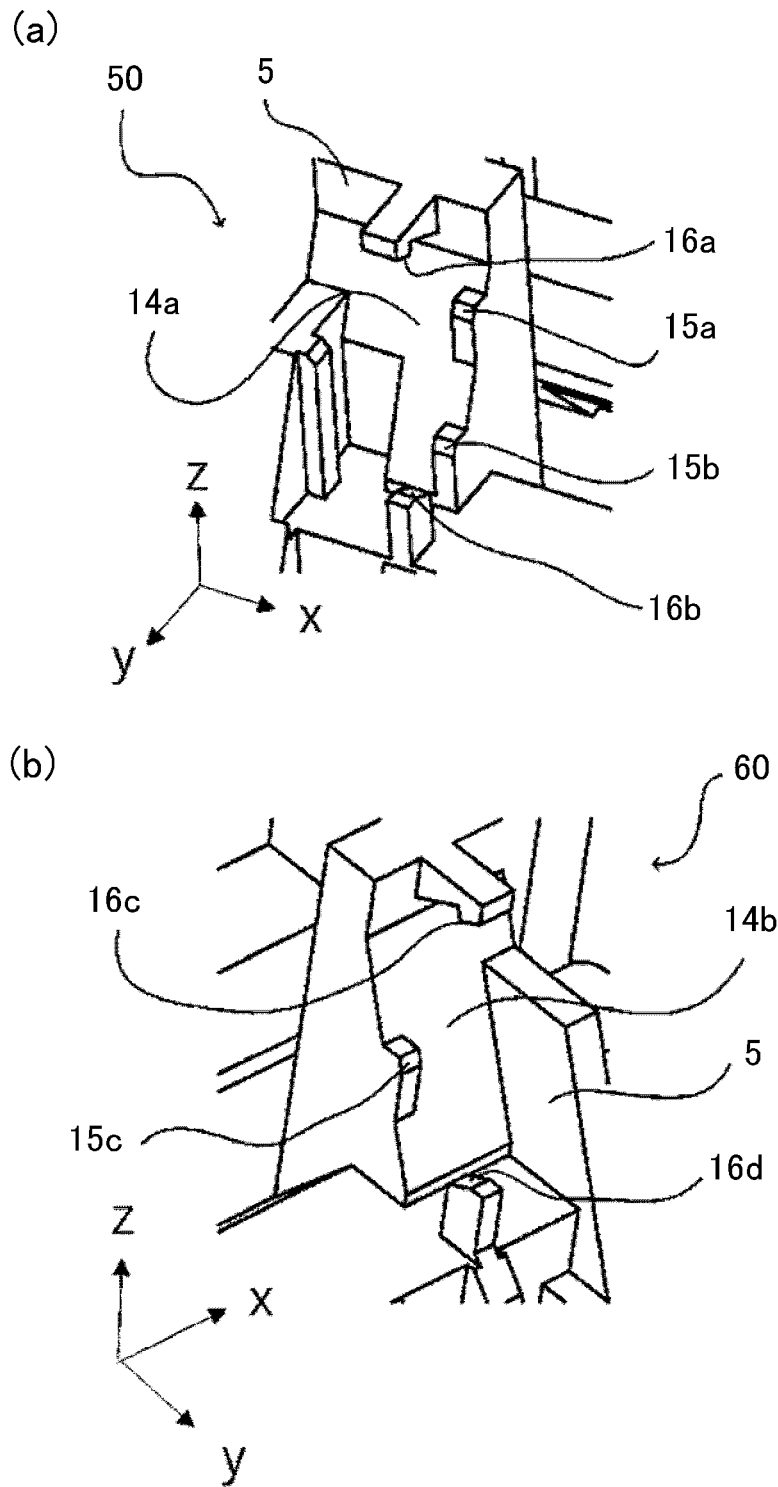
FIG. 3, part (a) and part(b), is a perspective view showing a housing shape in a vicinity of a reflecting mirror according to the embodiment of the present invention.

Next, mounting the reflecting mirror 11 on the housing 5 will be described. First, shapes in vicinities of the positioning portion 50 and the positioning portion 60 in the housing 5 will be described by using the perspective views in part (a) and part (b) of FIG. 3. For a description, the reflecting mirror 11 and the holding spring 12 are omitted from figures. The positioning portion 50 of the housing 5 shown in part (a) of FIG. 3 is provided on one end side of the reflecting mirror 11 in the X direction. The positioning portion 50 includes a bearing surface 15a and a bearing surface 15b, and a position regulating portion 16a and a position regulating portion 16b. The bearing surface 15a which is a first bearing surface is provided on a side of the position regulating portion 16a which is a first regulating portion (first regulating portion side) in a P direction which is a second direction as will be described below. The bearing surface 15b which is a second bearing surface is provided on a side of the position regulating portion 16b which is a second regulating portion (second regulating portion side) in the P direction. The position regulating portion 16a is shaped to protrude toward the surface 11g of the reflecting mirror 11 while it is assembled in a regular attitude (correct attitude). That is, when the reflecting mirror 11 is supported on the bearing surface 15a and the bearing surface 15b in the correct attitude, a portion of the housing 5, which is opposed to the first ridgeline 11b of the reflecting mirror between the second surface 11f and the third surface 11g in a direction toward the opening of the housing 5, is recessed deeper than the first regulating portion 16a (reference numeral 16a1 in part (a) of FIG. 4). The position regulating portion 16b is shaped to protrude toward the surface 11h of the reflecting mirror 11 while it is assembled in the regular attitude. That is, when the reflecting mirror 11 is supported on the bearing surface 15a and the bearing surface 15b in the correct attitude, a portion of the housing 5, which is opposed to the second ridgeline 11c of the reflecting mirror between the second surface 11f and the fourth surface 11d in an opposite direction to a direction toward the opening of the housing 5, is recessed deeper than the second regulating portion 16b (reference numeral 16b1 in part (a) of FIG. 4).

Further, the positioning portion 60 of the housing 5 shown in part (b) of FIG. 3 is provided at a side of the other end of the reflecting mirror 11 in the X direction. The positioning portion 60 includes a bearing surface 15c which is a third bearing surface, a position regulating portion 16c (first regulating portion), and a position regulating portion 16d (second regulating portion). The position regulating portion 16c is shaped to protrude toward the surface 11g of the reflecting mirror 11 while it is assembled in the regular attitude. That is, when the reflecting mirror 11 is supported on the bearing surface 15c, a portion of the housing 5, which is opposed to the first ridgeline 11b of the reflecting mirror between the second surface 11f and the third surface 11g in a direction toward the opening of the housing 5, is recessed deeper than the first regulating portion 16c (reference numeral 16c1 in part (a) of FIG. 4). The position regulating portion 16d is shaped to protrude toward the surface 11h of the reflecting mirror 11 while it is assembled in the regular attitude. That is, when the reflecting mirror 11 is supported on the bearing surface 15a and the bearing surface 15b in the correct attitude, a portion of the housing 5, which is opposed to the second ridgeline 11c of the reflecting mirror between the second surface 11f and the fourth surface 11d in an opposite direction to a direction toward the opening of the housing 5, is recessed deeper than the second regulating portion 16d (reference numeral 16d1 in part (b) of FIG. 4).

The bearing surface 15a and the bearing surface 15b are convex with respect to a base surface 14a, and the bearing surface 15c is convex with respect to a base surface 14b. Here, the base surface 14a and the base surface 14b are opposed to the surface 11f of the reflecting mirror 11 and are base surfaces in which the bearing surface 15a, the bearing surface 15b, and the bearing surface 15c are provided. In this way, one positioning portion which is the positioning portion 50 includes two bearing surfaces which are the bearing surface 15a and the bearing surface 15b, and the other positioning portion which is the positioning portion 60 includes one bearing surface which is the bearing surface 15c.

Next, a state that the reflecting mirror 11 is assembled with the housing 5 in the regular attitude is shown in a sectional view which is viewed in a longitudinal direction (main scanning direction) of the mirror in part (a) and part (b) of FIG. 4. Part (a) of FIG. 4 is a sectional view of the positioning portion 50, and part (b) of FIG. 4 is a sectional view of the positioning portion 60. Incidentally, for a description below, a direction, which is substantially parallel to a virtual plane which is constituted of the bearing surface 15a, the bearing surface 15b, and the bearing surface 15c and is substantially parallel to an arrangement direction of the bearing surface 15a and the bearing surface 15b, is defined as the P direction. Further, a direction which is substantially perpendicular to the P direction is defined as a Q direction which is a third direction, a direction in which the laser light is scanned by the optical deflector 9 (main scanning direction) is defined as an S axis (X direction), and a direction which is perpendicular to the S axis is defined as the Z direction.

The reflecting mirror 11 is abutted with the bearing surface 15a, the bearing surface 15b, and the bearing surface 15c and a mounting angle of the reflecting mirror is determined when the reflecting mirror 11 is urged by the holding spring 12, and a reflected laser light is focused and scanned to a predetermined position on the photosensitive drum 1101. That is, an emitting position of the laser light in the scanning optical device 1 on the photosensitive drum 1101 is secured.

Incidentally, a reason why the angle of the reflecting mirror 11 is set to be determined in the embodiment by abutting with the bearing surface 15a, the bearing surface 15b, and the bearing surface 15c is to stabilize an initial angle of the reflecting mirror 11 around the S axis. Specifically, the angle around the S axis is determined by the bearing surface 15a and the bearing surface 15b among the bearing surface 15a, the bearing surface 15b, and the bearing surface 15c. Thus, the angle around the S axis of the reflecting mirror 11 is not affected by a relative position of the bearing surface 15a, the bearing surface 15b, and the bearing surface 15c which are arranged on both sides of the elongated reflecting mirror 11, and is determined, so it is possible to stabilize the initial angle.

The position regulating portion 16a, the position regulating portion 16b, the position regulating portion 16c, and the position regulating portion 16d are arranged above and below the reflecting mirror 11 in the P direction. A width Wa of the position regulating portion 16a and the position regulating portion 16b and a width Wb of the position regulating portion 16c and the position regulating portion 16d are both wider (larger) than a width Wm of the reflecting mirror 11 (Wa>Wm, Wb>Wm). Thus, while the reflecting mirror 11 is assembled with the positioning portion 50 and the positioning portion 60 in the regular attitude, the surface 11g of the reflecting mirror 11 is not abutted with the position regulating portion 16a and the position regulating portion 16c, and the surface 11h of the reflecting mirror 11 is not abutted with the position regulating portion 16b and the position regulating portion 16d.

Here, the width Wa is a distance between the position regulating portion 16a and the position regulating portion 16b in the P direction, and the width Wb is a distance between the position regulating portion 16c and the position regulating portion 16d in the P direction. Further, the width Wm is a length of the reflecting mirror 11 in the P direction. Furthermore, since a load F of the holding spring 12 is applied only in the Q direction, the reflecting mirror 11 is possible to move in the P direction. Incidentally, the holding spring 12 includes an urging portion 12a, and the load F is generated when the urging portion 12a is abutted with and presses the surface 11e of the reflecting mirror 11.

By eliminating a constraint of the reflecting mirror 11 in the P direction, it is possible to make it easier to assemble the reflecting mirror 11 with the housing 5. Furthermore, since it is not necessary to make a shape on the holding spring 12 in order to urge in the P direction, there are advantages such as simplification and cost reduction of the holding spring 12. As for a quality of the scanning optical device 1, in a case that the reflecting mirror 11 moves in the P direction, the emitting position of the laser light on the photosensitive drum 1101 is not compromised, when the reflecting mirror 11 is abutted with the bearing surface 15a, the bearing surface 15b, and the bearing surface 15c, since the mounting angle of the reflecting mirror 11 is not changed. (Effect of Impact which is Applied to the Scanning Optical Device during a Transportation Process, etc.)

The position regulating portion 16a and the position regulating portion 16c are arranged inside the ridgeline 11a and the ridgeline 11b of the reflecting mirror 11 in the Q direction. Further, the position regulating portion 16b and the position regulating portion 16d are arranged inside the ridgeline 11c and the ridgeline 11d of the reflecting mirror 11 in the Q direction. In this way, it is possible suppress a change of the attitude of the reflecting mirror 11 due to an effect of an impact which is applied to the image forming apparatus during a transportation process, etc.

Figure 5:
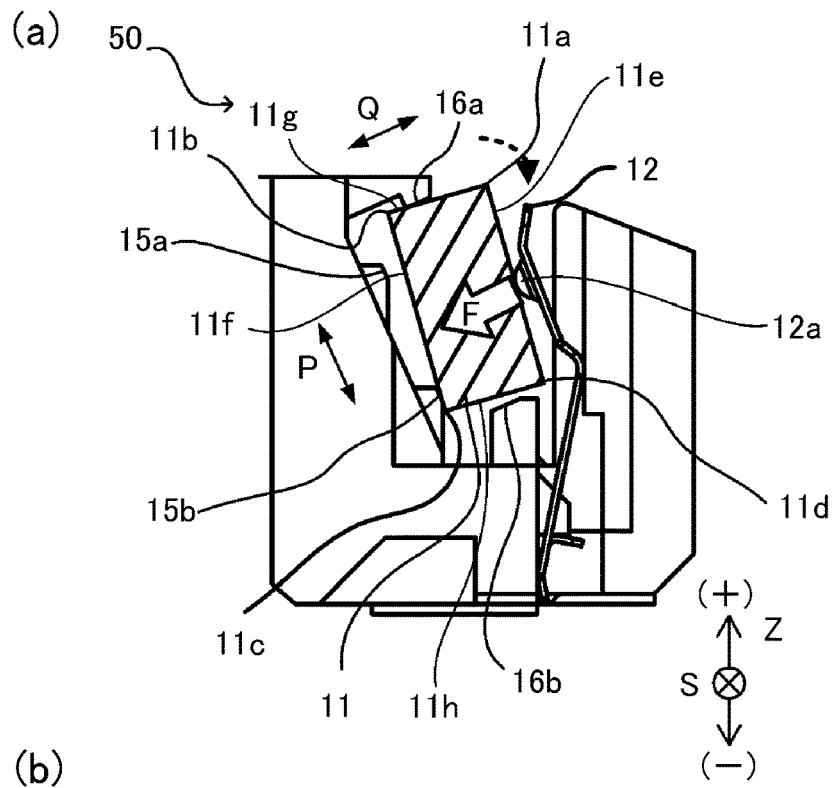
FIG. 5, part(a) and part(b), is a sectional view showing the reflecting mirror while its attitude is changed according to the embodiment of the present invention.
Figure 5:
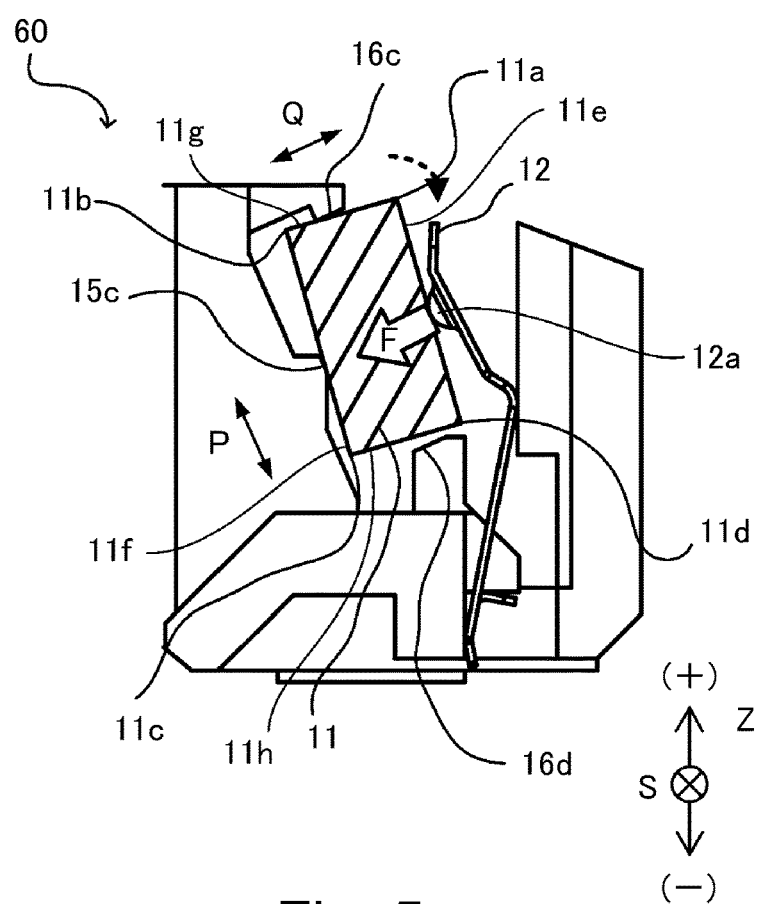
Figure 6:
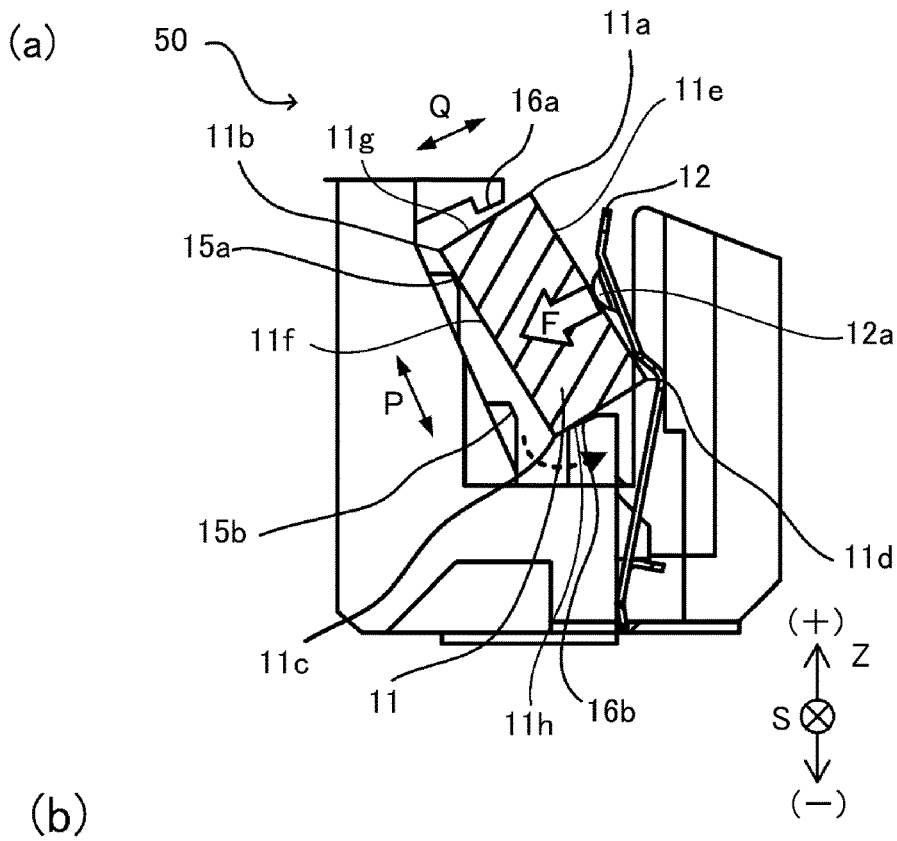
FIG. 6, part(a) and part(b), is a sectional view showing the reflecting mirror while its attitude is changed according to the embodiment of the present invention.
Figure 6:
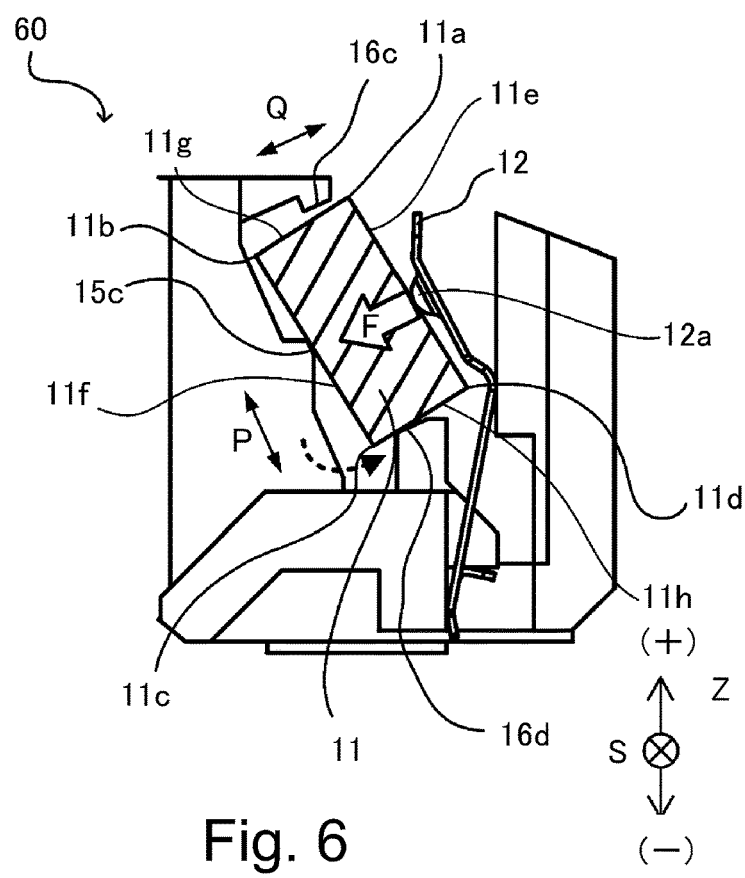

An effect of the embodiment will be described by using part (a) and part (b) of FIG. 5, and part (a) and part (b) of FIG. 6. FIG. 5 is a sectional view of the reflecting mirror 11 which is viewed in the longitudinal direction (main scanning direction), showing an example of an attitude of the reflecting mirror 11 in a case that an impact is applied. Part (a) of FIG. 5 and part (a) of FIG. 6 are showing sectional views of the positioning portion 50, and Part (b) of FIG. 5 and part (b) of FIG. 6 are showing sectional views of the positioning portion 60.

(Case 1 of Deviation of Attitude Due to Impact)

Part (a) and part (b) of FIG. 5 are showing a case that an attitude of the reflecting mirror 11 changes in a Z+ (plus) direction and in a clockwise direction around the S axis (dotted arrows in the figures) due to an impact. The reflecting mirror 11 floats out from the bearing surface 15a and comes into contact with the position regulating portion 16a and the position regulating portion 16c. However, the ridgeline 11a and the ridgeline 11b of the reflecting mirror 11 are not in contact with any of the position regulating portion 16a and the position regulating portion 16c, and both the position regulating portion 16a and the position regulating portion 16c are in contact with the surface 11g which is inside the ridgeline 11a and the ridgeline 11b. In that case, an only obstacle in a case that the reflecting mirror 11 is moved in the Q direction due to the load F of the holding spring 12 is a frictional force between the reflecting mirror 11 and the position regulating portion 16a and the position regulating portion 16c. Thus, it is possible to easily return the mirror 11 from a state shown in part (a) and part (b) of FIG. 5 to the regular attitude as shown in part (a) and part (b) of FIG. 4 by the load F of the holding spring 12.

(Case 2 of Deviation of Attitude Due to Impact)

Part (a) and part (b) of FIG. 6 are showing a case that the attitude of the reflecting mirror 11 changes in a Z− (minus) direction and in a counterclockwise direction around the S axis (dotted arrows in the figures) due to an impact. The reflecting mirror 11 floats out from the bearing surface 15b and comes into contact with the position regulating portion 16b and the position regulating portion 16d. However, the ridgeline 11c and the ridgeline 11d of the reflecting mirror 11 are not in contact with any of the position regulating portion 16b and the position regulating portion 16d, and both the position regulating portion 16b and the position regulating portion 16d are in contact with the surface 11h which is inside the ridgeline 11c and the ridgeline 11d. In that case, an only obstacle in a case that the reflecting mirror 11 is moved in the Q direction due to the load F of the holding spring 12 is a frictional force between the reflecting mirror 11 and the position regulating portion 16b and the position regulating portion 16d. Thus, it is possible to easily return the mirror 11 from a state shown in part (a) and part (b) of FIG. 6 to the regular attitude as shown in part (a) and part (b) of FIG. 4 by the load F of the holding spring 12. In this way, in a case that an impact is applied to the scanning optical device 1, the attitude of the reflecting mirror 11 may change temporarily, however, since it easily returns to the regular attitude by the load F of the holding spring 12, the emitting position is not changed.

COMPARATIVE EXAMPLE

Figure 7:
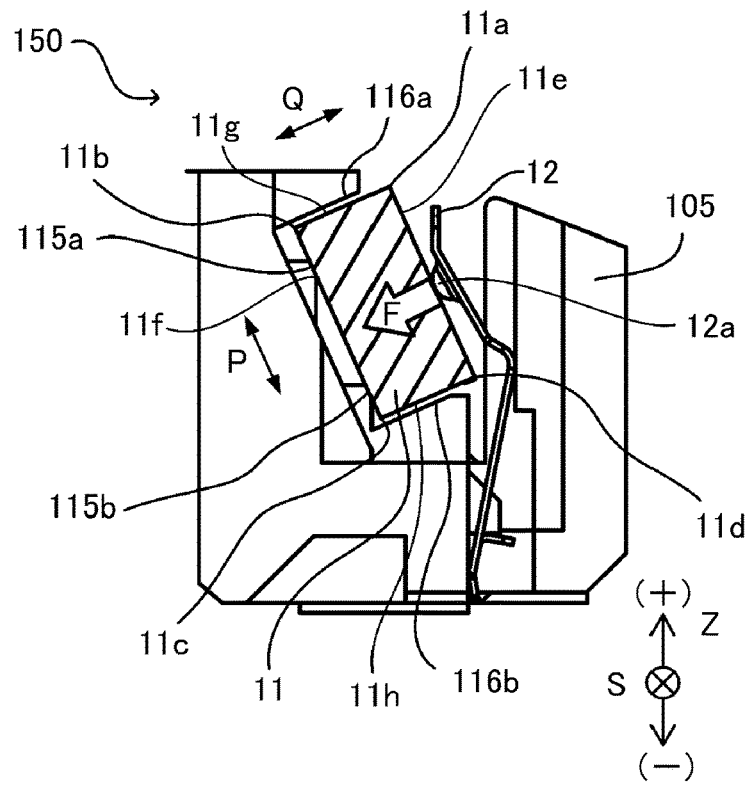
FIG. 7, part(a) and part(b), is a sectional view showing the reflecting mirror (normal attitude) in a comparative example for comparison with the embodiment of the present invention.
Figure 7:
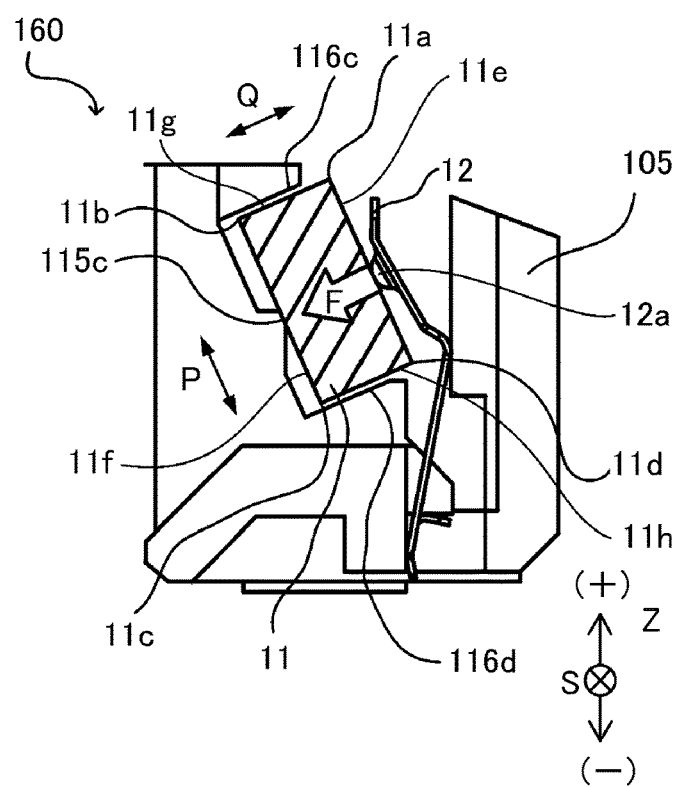
Figure 8:
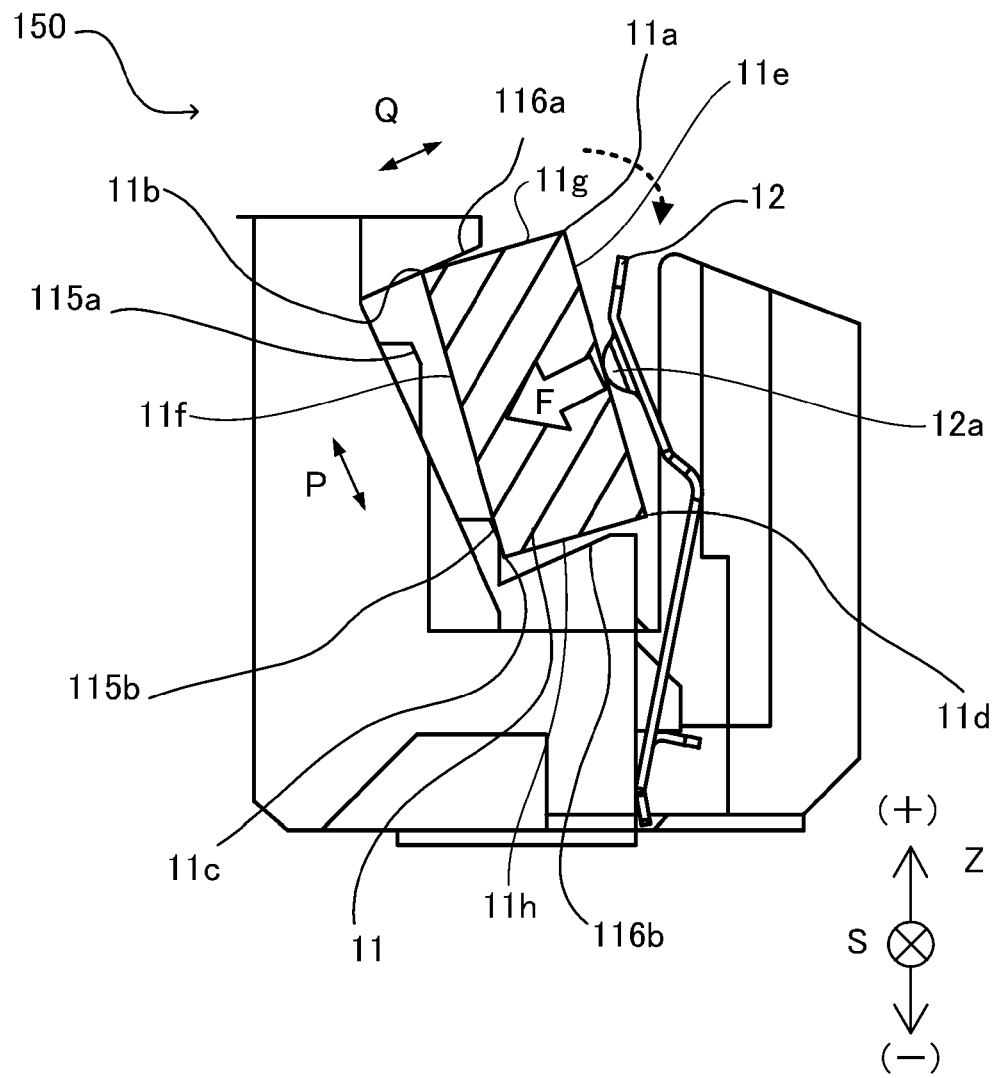
FIG. 8 is a sectional view showing a reflecting mirror in the comparative example (attitude is changed) for comparison with the embodiment of the present invention.

On the other hand, unlike the embodiment, in a case that position regulating portions are arranged outside the ridgeline 11b and the ridgeline 11c of the reflecting mirror 11 in the Q direction, changes in attitudes of the reflecting mirror 11, when an impact is applied, are shown in part (a) and part (b) of FIG. 7, and FIG. 8. Part (a) and part (b) of FIG. 7 is a sectional view showing a state that the reflecting mirror 11 is in a regular attitude, and FIG. 8 is a sectional view which is viewed from a positioning portion 150 in a case that the reflecting mirror 11 moves in the Z+(plus) direction and the clockwise direction around the S axis due to an impact. The reflecting mirror 11 and the holding spring 12 are same as in the embodiment. However, a shape of a housing 105 is different from the embodiment, and the positioning portion is different from the embodiment accordingly.

The positioning portion 150, which is shown in part (a) of FIG. 7, corresponds to the positioning portion 50 in the embodiment. In the regular attitude, the reflecting mirror 11 is abutted with the bearing surface 115a and the bearing surface 115b, and the position regulating portion 116a and the position regulating portion 116b are arranged above and below the reflecting mirror 11 in the P direction. In the regular attitude, the position regulating portion 116a and the position regulating portion 116b are not abutted with the surface 11g and the surface 11h of the mirror 11, respectively. Further, a positioning portion 160 which is shown in part (b) of FIG. 7 corresponds to the positioning portion 60 in the embodiment. In the regular attitude, the reflecting mirror 11 is abutted with the bearing surface 115c, and the position regulating portion 116c and the position regulating portion 116d are arranged above and below the reflecting mirror 11 in the P direction. In the regular attitude, the position regulating portion 116c and the position regulating portion 116d are not abutted with the surface 11g and the surface 11h of the mirror 11, respectively.

In the embodiment, as shown in part (a) and part (b) of FIG. 4, the position regulating portion 16a, the position regulating portion 16b, the position regulating portion 16c, and the position regulating portion 16d are arranged inside the ridgeline 11a and the ridgeline 11b of the reflecting mirror 11 and inside the ridgeline 11c and the ridgeline 11d of the reflecting mirror 11 in the Q direction. On the other hand, in part (a) and part (b) of FIG. 7, and FIG. 8, the position regulating portion 116a, the position regulating portion 116b, the position regulating portion 116c, and the position regulating portion 116d are arranged outside the ridgeline 11b of the reflecting mirror 11 and even outside the ridgeline 11c in the Q direction. In case of the constitution, when the reflecting mirror 11 moves as shown in FIG. 8, the reflecting mirror 11 contacts the position regulating portion 116a at the ridgeline 11b. In that case, when the reflecting mirror 11 moves in the Q direction due to the load F of the holding spring 12, the ridgeline 11b is caught by the position regulating portion 116a, and its attitude is maintained and does not return to its original attitude. Thus, the mounting angle of the reflecting mirror 11, that is the regular attitude, is changed (deviation), and the emitting position is changed.

Incidentally, FIG. 8 is showing a state of the positioning portion 150 when an impact is applied such that the reflecting mirror 11 moves in the Z plus direction and the clockwise direction around the S axis (dotted arrow in the figure), as shown in part (a) of FIG. 5. Similar attitude change may occur on the positioning portion 160 as well as on the positioning portion 150. Further, depending on a direction of the attitude change of the reflecting mirror 11 due to the impact, other ridgelines (the ridgeline 11a, the ridgeline 11c, the ridgeline 11d) of the reflecting mirror 11 may be caught by position regulating portions (the position regulating portion 116a, the position regulating portion 116b, the position regulating portion 116c, the position regulating portion 116d), a change in the mounting angle of the reflecting mirror 11 may occur.

(Optimal Positions of Position Regulating Portion)

Figure 9:
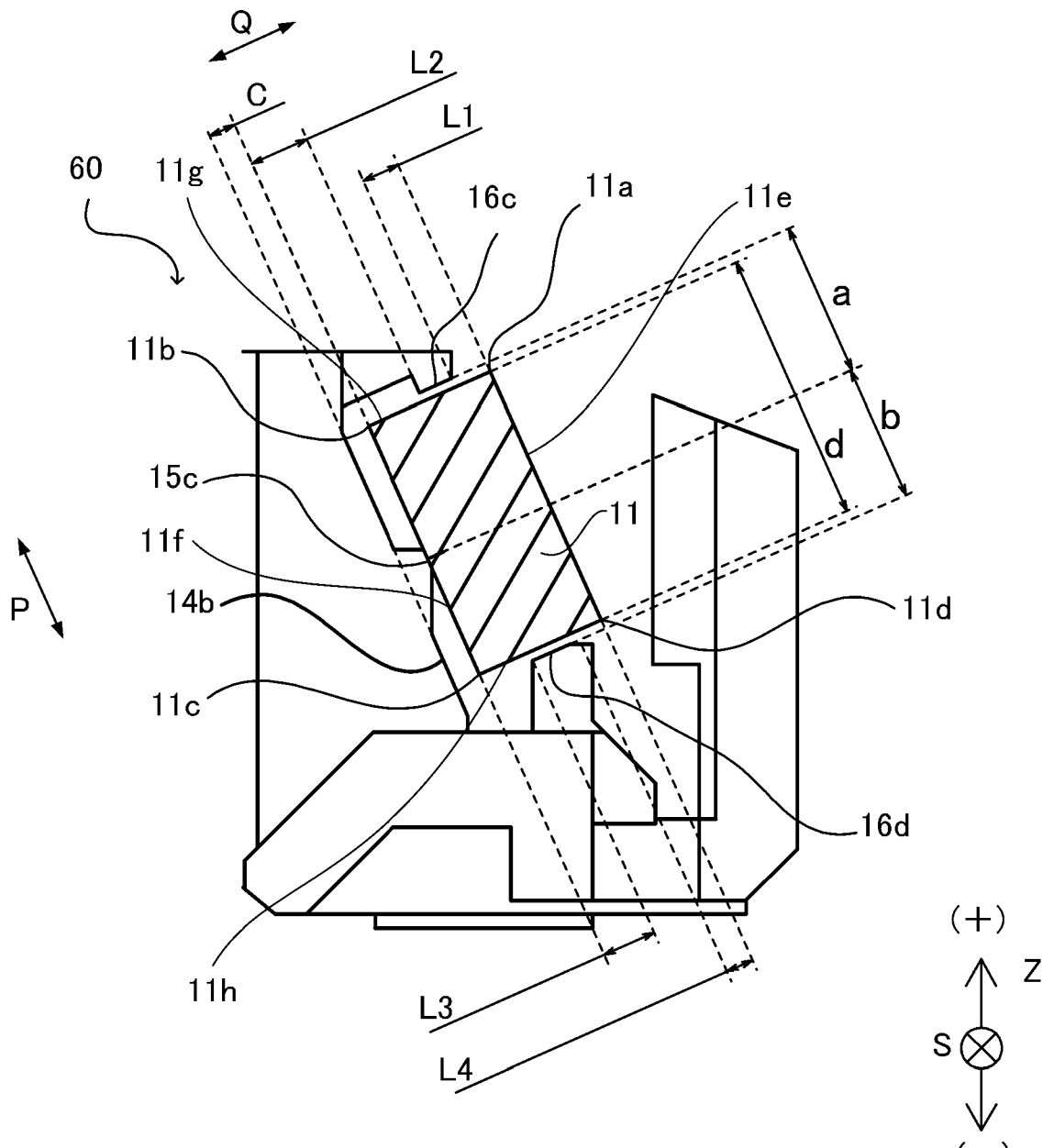
FIG. 9 is a sectional view showing a positional relationship of the position regulating portion according to the embodiment of the present invention.

Next, optimal positions of the position regulating portions in the embodiment will be described by using FIG. 9. FIG. 9 is a sectional view at a position of the positioning portion 60, and shows positions of the position regulating portion 16c and the position regulating portion 16d with respect to the ridgeline 11a, the ridgeline 11b, the ridgeline 11c, and the ridgeline 11d. In the embodiment, in the positioning portion 60 which supports the reflecting mirror 11 at a single point of the bearing surface 15c, since the bearing surface 15c is convex with respect to the base surface 14b in the Q direction, there are spaces above and below in the P direction and the reflecting mirror 11 may move during a transportation process, etc. Thus, it is desirable to arrange the reflecting mirror 11 so that the ridgeline 11a, the ridgeline 11b, the ridgeline 11c, and the ridgeline 11d may not hit the position regulating portion 16c and the position regulating portion 16d when the mirror 11 moves by that amount.

Symbols in the figures will be described. A distance a is defined as a distance between the bearing surface 15c and the position regulating portion 16c in the P direction. A distance b is defined as a distance between the bearing surface 15c and the position regulating portion 16d in the P direction. An amount of protrusion c is defined as an amount of protrusion of the bearing surface 15c with respect to the base surface 14b in the Q direction.

It is desirable that when a width, which is a length of the reflecting mirror 11 in the P direction, is defined as a width d, a distance L1 from the position regulating portion 16c to the ridgeline 11a in the Q direction is $$L1 \geq c \times b/(d-b),$$

a distance L2 from the position regulating portion 16c to the ridgeline 11b in the Q direction is $$L2 \geq c \times b/(d-b),$$

a distance L3 from the position regulating portion 16d to the ridgeline 11c in the Q direction is $$L3 \geq c \times a/(d-a), \text{ and}$$

a distance L4 from the position regulating portion 16d to the ridgeline 11d in the Q direction is $$L4 \geq c \times a/(d-a).$$

In specific numerical examples, when the distance a is 5 mm, the distance b is 5.7 mm, the amount of protrusion c is 0.15 mm, and the width d is 10 mm, it is desirable to secure that the distance L1 and the distance L2 are 0.20 mm or more, the distance L3 and the distance L4 are 0.15 mm or more, respectively.

DESCRIPTIONS OF MODIFIED EXAMPLES

Modified Example 1

Figure 10:
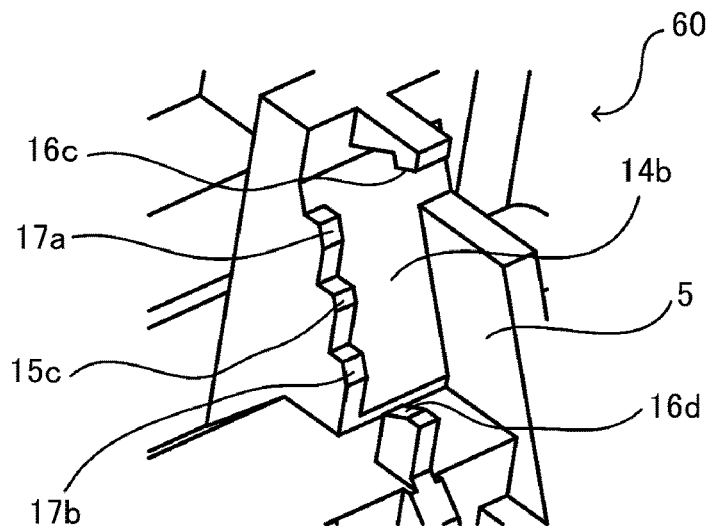
FIG. 10, part(a) and part(b), is a perspective view showing the housing shape in the vicinity of the reflecting mirror in a modified example 1, and a sectional view showing the reflecting mirror in its normal position FIG. 11, part(a) and part(b), is a sectional view showing the reflecting mirror while its attitude is changed in the modified example 1, and a sectional view showing the reflecting mirror while it is in a normal attitude in a modified example 2.
Figure 10:
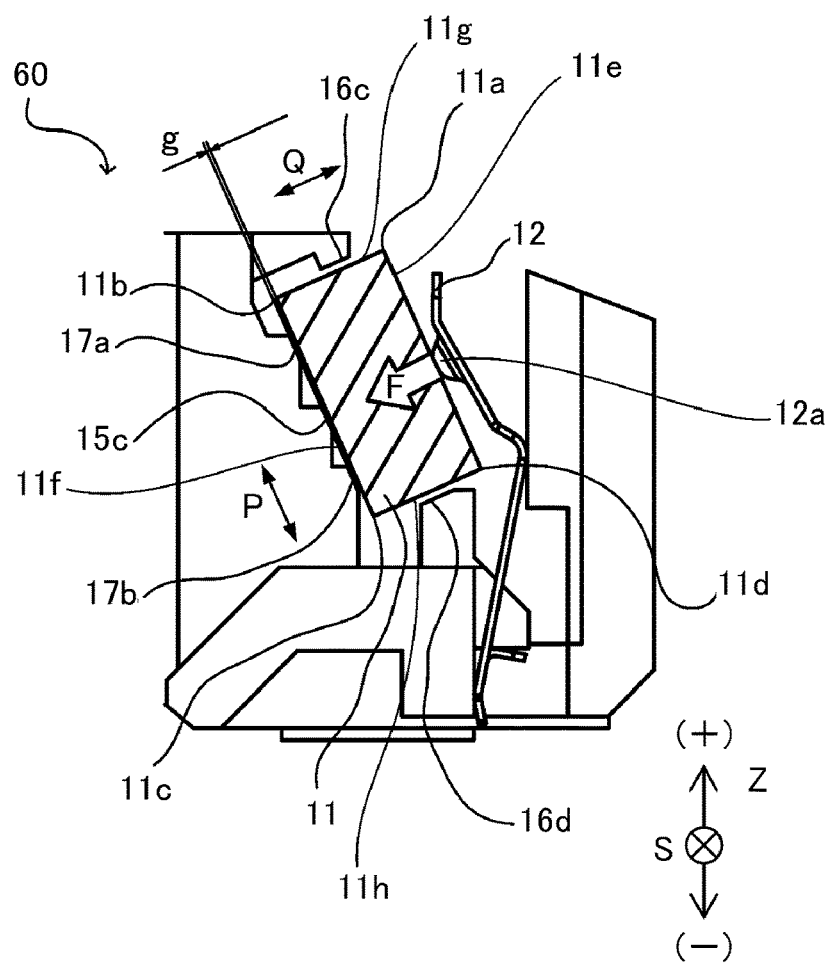

Next, a modified example 1 of the embodiment is shown in part (a) and part (b) of FIG. 10. Part (a) of FIG. 10 is a perspective view of the housing 5 in a vicinity of the positioning portion 60, and part (b) of FIG. 10 is a sectional view which is viewed from the positioning portion 60. A backup surface 17a which is a first protrusion portion and a backup surface 17b which is a second protrusion portion are provided above and below the bearing surface 15c in the P direction. The backup surface 17a is provided in a vicinity of the bearing surface 15c in the P direction, and the backup surface 17b is provided in an opposite side of the backup surface 17a across the bearing surface 15c in the P direction. In this way, it is possible to regulate a change of an attitude of the reflecting mirror 11 within a certain range during the transportation process, etc.

Amounts of protrusions of the backup surface 17a and the backup surface 17b in the Q direction is smaller than the amount of the protrusion of the bearing surface 15c in the Q direction. Even in a case that the backup surface 17a and the backup surface 17b are not provided, the regulation is effective in the same way by lowering (reducing) a convex amount (the amount of protrusion c as described above) of the bearing surface 15c with respect to the base surface 14b. However, by limiting a number of surfaces, it is easier to correct a mold during molding and to improve positional accuracy, and it is possible to minimize a position g of the backup surface with respect to the bearing surface 15c in the Q direction.

Figure 11:
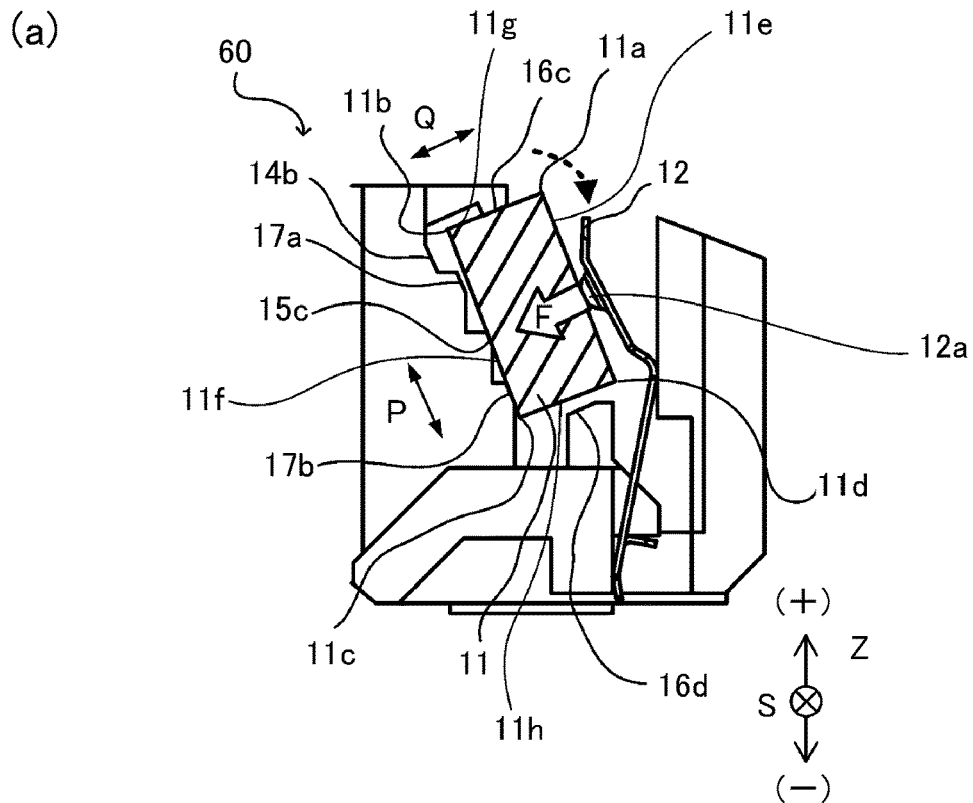
Figure 11:
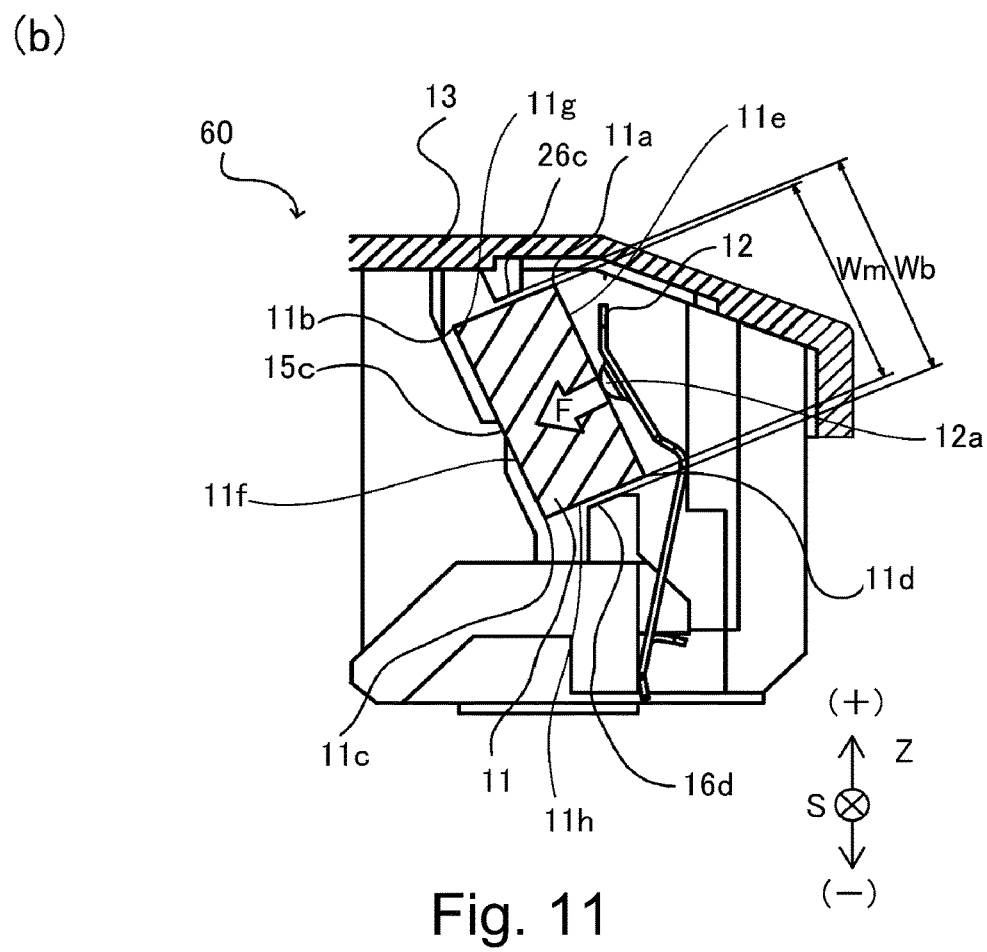

Further, the backup surface 17a and the backup surface 17b are arranged inside the ridgeline 11b and the ridgeline 11c of the reflecting mirror 11 in the P direction. Thus, even when the attitude of the reflecting mirror 11 changes during the transportation process, etc. as shown in part (a) of FIG. 11, the ridgeline 11b and the ridgeline 11c do not come into contact with the backup surface 17a and the backup surface 17b. Here, part (a) of FIG. 11 is showing a state of the positioning portion 60 when an impact is applied such that the reflecting mirror 11 moves in the Z plus direction and the clockwise direction around the S axis (dotted arrow in the figure), as shown in part (a) of FIG. 5. Furthermore, in part (a) of FIG. 11, the backup surface 17b is abutted with the surface 11f, and the change of the attitude of the reflecting mirror 11 is regulated within a certain range. In this way, it is also possible to prevent the ridgeline 11c of the reflecting mirror 11 from coming into contact with the base surface 14b. Thus, it is possible to prevent the reflecting mirror 11 from keeping in the same attitude, since the ridgeline 11b and the ridgeline 11c are come into contact with and caught by the base surface 14b, the backup surface 17a and the backup surface 17b. Incidentally, the same applies for a case that an impact is applied such that the reflecting mirror 11 moves in the Z plus direction and the counterclockwise direction around the S axis (not shown). Other constitutions are the same as in the embodiment described above, so the same reference numerals are used and descriptions are omitted.

Modified Example 2

Next, a modified example 2 of the embodiment is shown in a sectional view in a vicinity of the positioning portion 60 in part (b) of FIG. 11. In the embodiment, the position regulating portion 16a, the position regulating portion 16b, the position regulating portion 16c, and the position regulating portion 16d are integrally molded with the housing 5, however, the present invention is not limited to this, and a part of them may be provided by a separate member such as a cover 13 which is a cover member to cover the opening of the housing 5, as shown in part (b) of FIG. 11. In part (b) of FIG. 11, the positioning portion 60 is shown. The position regulating portion 26c, which is positioned in the + side (upper side) in the Z direction, is provided with the cover 13 and is not integrally provided with the housing 5. On the other hand, the position regulating portion 16d, which is located in the − side (lower side) in the Z direction, is integrally molded with the housing 5, as in the embodiment described above. Although it is not shown in part (b) of FIG. 11, as for the positioning portion 50, in the same way, a position regulating portion (not shown) in the + side (upper side) in the Z direction is provided with the cover 13, and a position regulating portion (16b in FIG. 4, etc.) in the − side (lower side) in the Z direction is provided with the housing 5. Other constitutions are the same as in the embodiment described above, so the same reference numerals are used and descriptions are omitted.

Modified Example 3

Figure 12:
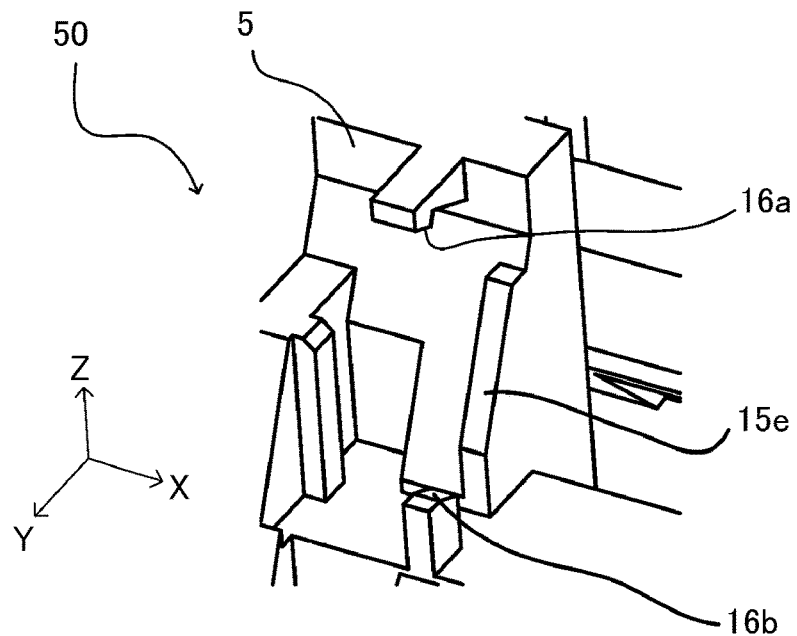
FIG. 12, part(a) and part(b), is a perspective view showing the housing shape in the vicinity of the reflecting mirror in the modified example 3.
Figure 12:
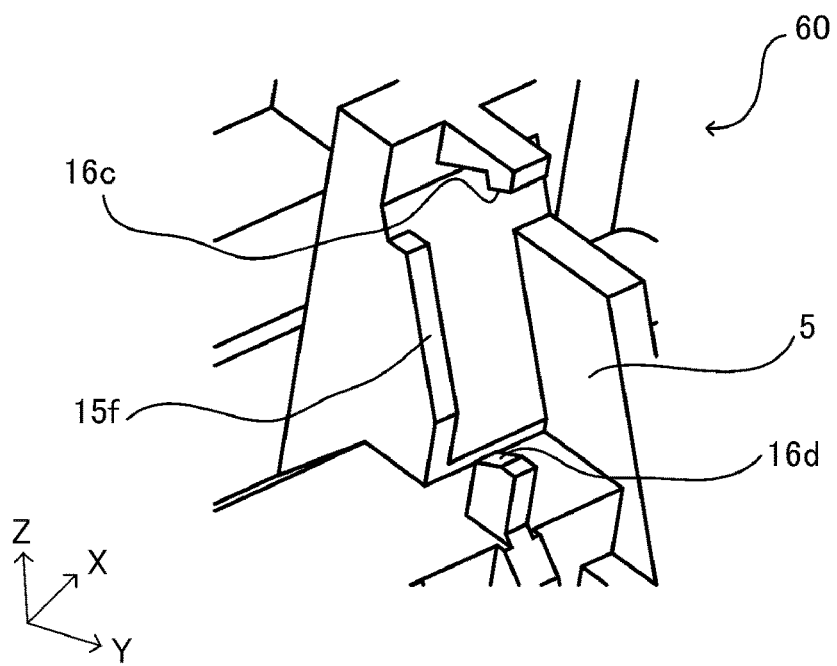
Figure 13:
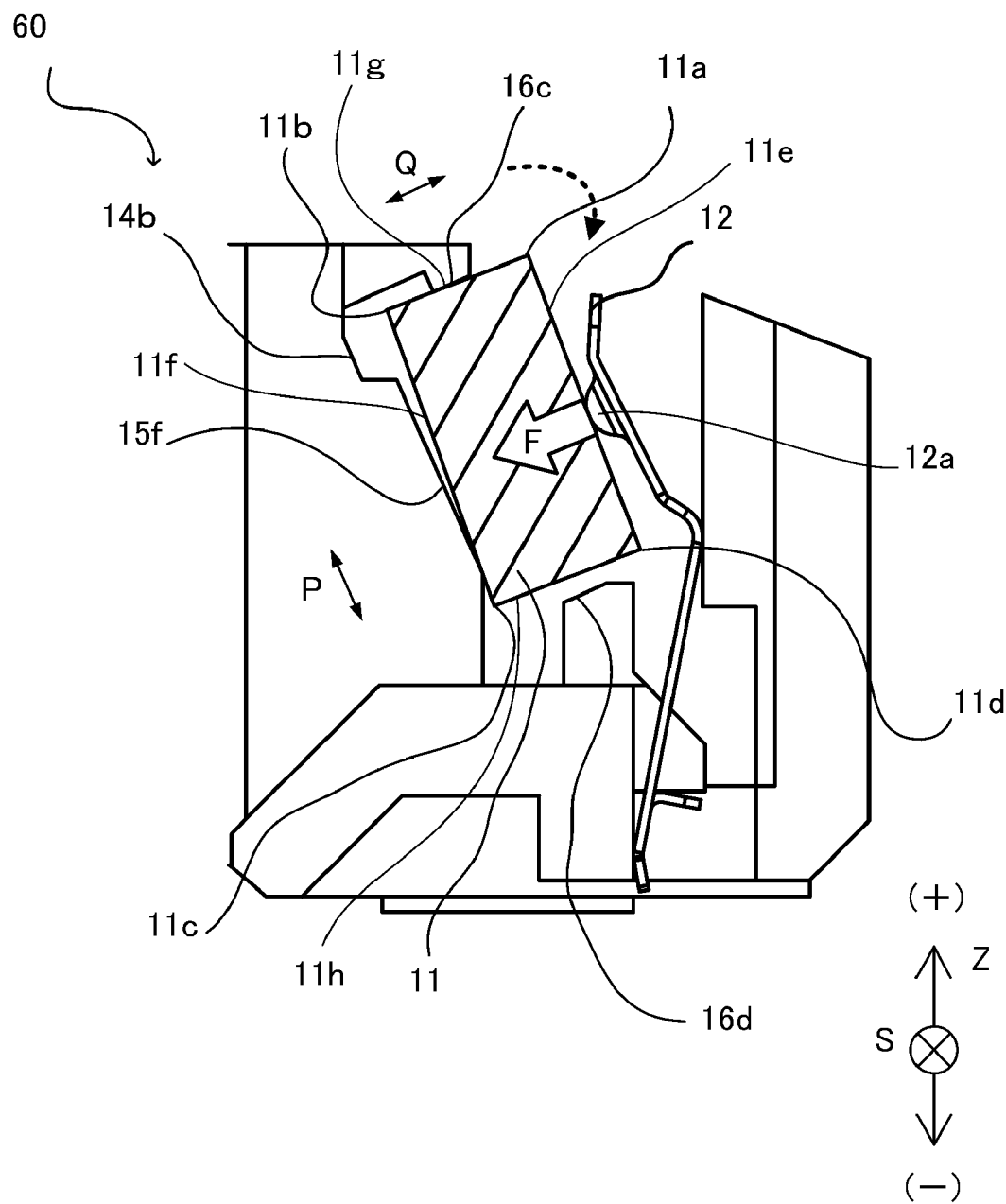
FIG. 13 is a sectional view showing the reflecting mirror while its attitude is changed in the modified example 3.

Next, a modified example 3 of the embodiment is shown in part (a) and part (b) of FIG. 12, and FIG. 13. In the embodiment described above, bearing surfaces of the reflecting mirror 11 are constituted of three bearing surfaces which are the bearing surface 15a, the bearing surface 15b, and the bearing surface 15c. In the modified example 3, bearing surfaces may be a bearing surface 15e and a bearing surface 15f which include surfaces extending in a short direction (P direction) of the reflecting mirror 11, as shown in the perspective view of the housing 5 in part (a) and part (b) of FIG. 12. The bearing surface 15e and the bearing surface 15d are abutted with the surface 11f of the reflecting mirror 11 in the regular attitude. Lengths of the surfaces extending in the P direction of the bearing surface 15e and the bearing surface 15d are shorter than a length of the reflecting mirror 11 in the P direction.

FIG. 13 is showing a state of the positioning portion 60 when an impact is applied such that the reflecting mirror 11 moves in the Z plus direction and the clockwise direction around the S axis (dotted arrows in the figure), in the same way as part (a) of FIG. 5. Since the bearing surface 15f extends in the short direction of the reflecting mirror 11, it is possible to regulate the reflecting mirror 11 from moving to a side of the bearing surface than its regular attitude in the Q direction when an impact is applied, as shown in the sectional view in a vicinity of the positioning portion 60 in FIG. 13. Thus, it is possible to suppress the change of the attitude change of the reflecting mirror 11. Incidentally, the same applies for a case that an impact is applied such that the reflecting mirror 11 moves in the Z minus direction and the counterclockwise direction around the S axis. Further, it is the same way for the positioning portion 50. Other constitutions are the same as in the embodiment described above, so the same reference numerals are used and descriptions are omitted. In this way, in the modified examples from 1 through 3, there are some differences in movements of the reflecting mirror 11 when impacts are applied respectively. However, since the movements, that the ridgeline 11a, the ridgeline 11b, the ridgeline 11c, and the ridgeline 11d of the reflecting mirror 11 do not come into contact with the position regulating portion 16a, the position regulating portion 16b, the position regulating portion 16c, and the position regulating portion 16d, are similar, effects which are obtained by the modified examples from 1 through 3 are not different from the effects which are obtained by the embodiments. Incidentally, a shape of a sectional view of the reflecting mirror 11 which is viewed from the longitudinal direction (main scanning direction) in the embodiment, is rectangular, however, the present invention is not limited to this, and the effect of the invention is not changed even when the mirror is a trapezoidal shape or a polygonal shape in which the ridgelines are chamfered, etc., for example.

According to the present invention, it is possible to reduce a deviation of laser light emission due to a change in the attitude of the reflecting mirror.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-087162 filed on May 24, 2021, which is hereby incorporated by reference herein in its entirety.

What is claimed is:

1. A scanning optical device for scanning an object to be scanned with a laser light, said scanning optical device comprising:
    a light source constituted to emit the laser light;
    a deflection unit constituted to deflect the laser light emitted from said light source;
    a reflecting mirror constituted to reflect the laser light deflected by said deflection unit to guide to the object to be scanned;
    a housing constituted to accommodate said deflection unit and said reflecting mirror; and
    an elastic member constituted to urge said reflecting mirror toward said housing,
    wherein said reflecting mirror includes a first surface urged by said elastic member, a second surface opposite to said first surface, a third surface substantially perpendicular to said first surface and said second surface, in parallel with a longitudinal direction of said reflecting mirror and closer to an opening of said housing, and fourth surface opposite to said third surface, wherein said housing includes a bearing surface constituted to support said second surface, and a regulating portion constituted to regulate movement of said reflecting mirror to a mirror widthwise direction, substantially perpendicular to the longitudinal direction and substantially parallel with said second surface, and toward said opening of said housing, said regulating portion being provided opposite to only a part of said third surface so that a ridge line of said reflecting mirror between said second surface and said third surface does not contact said regulating member even an attitude of said reflecting mirror changes in a direction away from said bearing surface when said reflecting mirror is viewed in the longitudinal direction, wherein two sets of a combination of said elastic member, said bearing surface and said regulating portion are provided in the longitudinal direction, and wherein a number of said bearing surface of one set of the combination is two and a number of said bearing surface of the other set of the combination is one.

2. A scanning optical device according to claim 1, wherein when said reflecting mirror is supported on said bearing surface at a correct attitude, a portion of said housing opposite to the ridge line of said reflecting mirror between said second surface and said third surface becomes a shape more recessed than said regulating portion with respect to the direction toward said opening of said housing.

3. A scanning optical device according to claim 2, wherein when said regulating portion is a first regulating portion, said housing includes a second regulating portion configured to regulate movement of said reflecting mirror to a direction opposite to the direction toward said opening of said housing, said second regulating portion being provided opposite to only a part of said fourth surface so that a ridge line of said reflecting mirror between said second surface and said fourth surface does not contact said second regulating portion even the attitude of said reflecting mirror changes in a direction away from said bearing surface when said reflecting mirror is viewed in the longitudinal direction.

4. A scanning optical device according to claim 3, wherein when said reflecting mirror is supported on said bearing surface at a correct attitude, a portion opposite to the ridge line of said reflecting mirror between said second surface and said fourth surface becomes a shape more recessed than said second regulating portion with respect to a direction opposite to the direction toward said opening of said housing.

5. A scanning optical device according to claim 3, wherein a distance between said first regulating portion and said second regulating portion is larger than a width of said reflecting mirror.

6. A scanning optical device according to claim 1, wherein when said bearing surface of the one set of the combination is a first bearing surface and a second bearing surface, said bearing surface of the other set of the combination is a third bearing surface, a ridge line between said second surface and said third surface is a first ridge line, a ridge line between said second surface and said fourth surface is a second ridge line, a ridge line between said first surface and said third surface is a third ridge line, and a ridge line between said first surface and said fourth surface is a fourth ridge line, and when a distance between said third bearing surface and said first regulating portion in the mirror widthwise direction is a, a distance between said third bearing surface and said second regulating portion in the mirror widthwise direction is b, a projecting amount of said third bearing surface projecting toward said second surface is c, and a width of said reflecting mirror is d, a distance L1 from said first regulating portion to said third ridge line in a mirror thickness direction satisfies $L1 \geq c \times b/(d-b)$, a distance L2 from said first regulating portion to said first ridge line in the mirror thickness direction satisfies $L2 \geq c \times b/(d-b)$, a distance L3 from said second regulating portion to said second ridge line in the mirror thickness direction satisfies $L3 \geq c \times a/(d-a)$, and a distance L4 from said second regulating portion to said fourth ridge line in the mirror thickness direction satisfies $L4 \geq c \times a/(d-a)$.

7. A scanning optical device according to claim 6, wherein when said housing includes a first projecting portion provided adjacent to said third bearing surface in the mirror widthwise direction, and a second projecting portion provided on a opposite side of said first projecting portion in the mirror widthwise direction across said third bearing surface, and wherein said first projecting portion and said second projecting portion is disposed between said first ridge line and said second ridge line, and a projecting amount thereof is smaller than the projecting amount of said third bearing surface.

8. A scanning optical device for scanning an object to be scanned with a laser light, said scanning optical device comprising:

a light source constituted to emit the laser light;

a deflection unit constituted to deflect the laser light emitted from said light source;

a reflecting mirror constituted to reflect the laser light deflected by said deflection unit to guide to the object to be scanned;

a housing constituted to accommodate said deflection unit and said reflecting mirror;

a cover constituted to cover an opening of said housing; and an elastic member constituted to urge said reflecting mirror toward said housing, wherein said reflecting mirror includes a first surface urged by said elastic member, a second surface opposite to said first surface, a third surface substantially perpendicular to said first surface and said second surface, in parallel with a longitudinal direction of said reflecting mirror and closer to said opening of said housing, and fourth surface opposite to said third surface, wherein said housing includes a bearing surface constituted to support said second surface, and said cover includes a regulating portion constituted to regulate movement of said reflecting mirror to a mirror widthwise direction, substantially perpendicular to the longitudinal direction and substantially parallel with said second surface, and toward the opening of said housing, said regulating portion being provided opposite to only a part of said third surface so that a ridge line of said reflecting mirror between said second surface and said third surface does not contact said regulating member even an attitude of said reflecting mirror changes in a direction away from said bearing surface when said reflecting mirror is viewed in the longitudinal direction, wherein two sets of a combination of said elastic member, said bearing surface and said regulating portion are provided in the longitudinal direction, and wherein a number of said bearing surface of one set of the combination is two and a number of said bearing surface of the other set of the combination is one.

9. A scanning optical device according to claim 8, wherein when said reflecting mirror is supported on said bearing surface at a correct attitude, a portion of said cover opposite to the ridge line of said reflecting mirror between said second surface and said third surface becomes a shape more recessed than said regulating portion with respect to the direction toward said opening of said housing.

10. A scanning optical device according to claim 8, wherein when said regulating portion is a first regulating portion, said housing includes a second regulating portion constituted to regulate movement of said reflecting mirror to a direction opposite to the direction toward said opening of said housing, said second regulating portion being provided opposite to only a part of said fourth surface so that a ridge line of said reflecting mirror between said second surface and said fourth surface does not contact said second regulating portion even the attitude of said reflecting mirror changes in a direction away from said bearing surface when said reflecting mirror is viewed in the longitudinal direction.

11. A scanning optical device according to claim 10, wherein when said reflecting mirror is supported on said bearing surface at a correct attitude, a portion opposite to the ridge line of said reflecting mirror between said second surface and said fourth surface becomes a shape more recessed than said second regulating portion with respect to a direction opposite to the direction toward said opening of said housing.

12. A scanning optical device for scanning an object to be scanned with a laser light, said scanning optical device comprising:
   a light source constituted to emit the laser light;
   a deflection unit constituted to deflect the laser light emitted from said light source;
   a reflecting mirror constituted to reflect the laser light deflected by said deflection unit to guide to the object to be scanned;
   a housing constituted to accommodate said deflection unit and said reflecting mirror; and
   an elastic member constituted to urge said reflecting mirror toward said housing,
   wherein said reflecting mirror includes a first surface urged by said elastic member, a second surface opposite to said first surface, a third surface substantially perpendicular to said first surface and said second surface, in parallel with a longitudinal direction of said reflecting mirror and closer to an opening of said housing, and fourth surface opposite to said third surface,
   wherein said housing includes a bearing surface constituted to support said second surface, and a regulating portion constituted to regulate movement of said reflecting mirror to a mirror widthwise direction, substantially perpendicular to the longitudinal direction and substantially parallel with said second surface, and toward said opening of said housing, said regulating portion being provided opposite to only a part of said third surface so that a ridge line of said reflecting mirror between said second surface and said third surface does not contact said regulating member even an attitude of said reflecting mirror changes in a direction away from said bearing surface when said reflecting mirror is viewed in the longitudinal direction, wherein when said reflecting mirror is supported on said bearing surface at a correct attitude, a portion of said housing opposite to the ridge line of said reflecting mirror between said second surface and said third surface becomes a shape more recessed than said regulating portion with respect to the direction toward said opening of said housing, wherein when said regulating portion is a first regulating portion, said housing includes a second regulating portion configured to regulate movement of said reflecting mirror to a direction opposite to the direction toward said opening of said housing, said second regulating portion being provided opposite to only a part of said fourth surface so that a ridge line of said reflecting mirror between said second surface and said fourth surface does not contact said second regulating portion even the attitude of said reflecting mirror changes in a direction away from said bearing surface when said reflecting mirror is viewed in the longitudinal direction, and wherein a distance between said first regulating portion and said second regulating portion is larger than a width of said reflecting mirror.

13. A scanning optical device according to claim 12, wherein when said reflecting mirror is supported on said bearing surface at a correct attitude, a portion opposite to the ridge line of said reflecting mirror between said second surface and said fourth surface becomes a shape more recessed than said second regulating portion with respect to a direction opposite to the direction toward said opening of said housing.

14. A scanning optical device according to claim 12, wherein two sets of a combination of said elastic member, said bearing surface and said regulating portion are provided in the longitudinal direction, and
   wherein a number of said bearing surface of one set of the combination is two and a number of said bearing surface of the other set of the combination is one.

15. A scanning optical device according to claim 14, wherein when said bearing surface of the one set of the combination is a first bearing surface and a second bearing surface, said bearing surface of the other set of the combination is a third bearing surface, a ridge line between said second surface and said third surface is a first ridge line, a ridge line between said second surface and said fourth surface is a second ridge line, a ridge line between said first surface and said third surface is a third ridge line, and a ridge line between said first surface and said fourth surface is a fourth ridge line, and
   when a distance between said third bearing surface and said first regulating portion in the mirror widthwise direction is a,
   a distance between said third bearing surface and said second regulating portion in the mirror widthwise direction is b, a projecting amount of said third bearing surface projecting toward said second surface is c, and a width of said reflecting mirror is d, a distance L1 from said first regulating portion to said third ridge line in a mirror thickness direction satisfies $$L1 \geq c \times b/(d-b),$$

a distance L2 from said first regulating portion to said first ridge line in the mirror thickness direction satisfies $$L2 \geq c \times b/(d-b),$$

a distance L3 from said second regulating portion to said second ridge line in the mirror thickness direction satisfies $$L3 \geq c \times a/(d-a), \text{ and}$$

a distance L4 from said second regulating portion to said fourth ridge line in the mirror thickness direction satisfies $$L4 \geq c \times a/(d-a).$$

16. A scanning optical device according to claim 15, wherein when said housing includes a first projecting portion provided adjacent to said third bearing surface in the mirror widthwise direction, and a second projecting portion provided on a opposite side of said first projecting portion in the mirror widthwise direction across said third bearing surface, and wherein said first projecting portion and said second projecting portion is disposed between said first ridge line and said second ridge line, and a projecting amount thereof is smaller than the projecting amount of said third bearing surface.

* * * * *